(12) United States Patent
Seven et al.

(10) Patent No.: US 7,622,031 B2
(45) Date of Patent: Nov. 24, 2009

(54) METHOD FOR PREPARING OXIDIZED POLYOLEFIN WAXES

(75) Inventors: Manfred K. Seven, Long Valley, NJ (US); Mark R. Wheeler, Rockaway, NJ (US)

(73) Assignee: Honeywell International Inc, Morristown, NJ (US)

( * ) Notice: Subject to any disclaimer, the term of this patent is extended or adjusted under 35 U.S.C. 154(b) by 327 days.

(21) Appl. No.: 11/623,241

(22) Filed: Jan. 15, 2007

(65) Prior Publication Data

US 2008/0171903 A1   Jul. 17, 2008

(51) Int. Cl.
*C07C 2/02* (2006.01)

(52) U.S. Cl. .................. 208/20; 208/29; 585/9; 525/333.7; 525/333.8

(58) Field of Classification Search ............ 208/20, 208/29; 585/9; 252/333.7, 333.8
See application file for complete search history.

(56) References Cited

U.S. PATENT DOCUMENTS

| | | | |
|---|---|---|---|
| 2,153,553 A | 4/1939 | Fawcett et al. | |
| 2,816,883 A | 12/1957 | Larchar et al. | |
| 2,825,721 A | 3/1958 | Hogan et al. | |
| 2,949,447 A | 8/1960 | Townend et al. | |
| 3,154,530 A * | 10/1964 | Mullen | 528/499 |
| 3,293,112 A | 12/1966 | Kehr | |
| 3,322,711 A | 5/1967 | Bush et al. | |
| 3,329,667 A * | 7/1967 | Braude et al. | 525/388 |
| 4,459,388 A | 7/1984 | Hettche et al. | |
| 4,889,897 A * | 12/1989 | Schuster et al. | 525/388 |
| 5,064,908 A * | 11/1991 | Schuster et al. | 525/333.8 |
| 5,401,811 A | 3/1995 | Stuart | |
| 5,516,822 A * | 5/1996 | Blanch et al. | 524/188 |
| 6,362,280 B1 | 3/2002 | Lences et al. | |
| 6,784,251 B2 | 8/2004 | Lences et al. | |

FOREIGN PATENT DOCUMENTS

| | | |
|---|---|---|
| GB | 471590 | 9/1937 |
| GB | 1087915 | 10/1967 |

* cited by examiner

*Primary Examiner*—Robert J Hill, Jr.
*Assistant Examiner*—Brian McCaig
(74) *Attorney, Agent, or Firm*—Carrie Beatus

(57) ABSTRACT

A method for producing an oxidized wax comprising (a) providing a uniform high molecular weight polyolefin resin feedstock having an average particle size smaller than about 30 mesh and a standard deviation in particle size of not greater than about 125 μm; and (b) oxidizing the resin particles in their solid state to produce a wax having a predetermined acid number.

23 Claims, No Drawings

METHOD FOR PREPARING OXIDIZED POLYOLEFIN WAXES

BACKGROUND

1. Field of Invention

The present invention relates to methods for preparing oxidized polyolefin waxes. More particularly, the invention relates to methods for preparing highly emulsifiable, high clarity polyolefin waxes from high molecular weight polyolefins via solid state oxidation.

2. Description of Prior Art

Oxidized waxes are useful in the formation of emulsions that can be used in many applications, including components in floor care products, lubricants for polymer processing, lubricants for textile applications, comestibles additives, protective sealants, as well as various other emulsion applications, such as in leather processing, water dispersible coatings, inks and resins. Waxes have a relative low molecular weight and are generally characterized as having one or more of the following properties: (a) solid at room temperature; (b) low melting point; (c) solidifies when cooled; (d) low viscosity at just above the melting point; and (e) insoluble in water. An "oxidized wax" is a substance which can be characterized by one or more of the aforementioned properties and is prepared by thermal and/or chemical degradation of a high molecular weight polyolefin resin (i.e., a polyethylene having a molecular weight >1,000,000). Oxidation processes lead to the formation of carboxyl functional groups on the wax, which incorporate polar functional groups in the wax thereby making it readily emulsifiable in aqueous medium.

The oxidation of polyolefins to form oxidized waxes is known. For example, polyethylenes can be oxidized by the action of oxygen at elevated temperatures to obtain oxidized products through chain degradation. (See, e.g., U.S. Pat. No. 3,293,112; U.S. Pat. No. 3,322,711; U.S. Pat. No. 4,459,388; and GB 1,087,915.) In one method oxidation occurs while the polyethylene is in the melt phase. The melt phase oxidation of polyethylene has some limits, however, such as requiring that the oxygen-containing gas be readily defused at high concentrations through the molten polyethylene. If the polyethylene is too viscous, the oxygen diffusion is very slow and impractical on a commercial scale. Thus, melt oxidation is generally limited to starting polymers of relatively low molecular weights (which are generally characterized by lower viscosities). Additionally, melt oxidation in some instances increases viscosity due to cross linking, further decreasing the oxygen diffusion and making emulsification difficult or impossible.

Solid state oxidation is another method for obtaining oxidized waxes from high molecular weight polyolefin resins through chain degradation. (See, e.g., U.S. Pat. No. 5,401,811; U.S. Pat. No. 5,064,908; and U.S. Pat. No. 3,322,711.) Compared to melt-phase oxidation, solid state oxidation is particularly advantageous because it foregoes the need to transform the resin into a liquid before it is oxidatively degraded. That is, oxidation of polyethylene at temperatures below its melting point precludes cross linking of the polymer. In addition, the starting polymer in solid state oxidation is not limited to low molecular weight materials because low viscosity is not a prerequisite.

It is highly desirable that oxidized wax emulsions be clear and colorless so as not to obscure or otherwise impart a color to the product for which it is being used. Unfortunately, the emulsion properties of oxidized waxes, particularly those obtained from a solid state thermo-oxidative degradation process, tend to be inconsistent, often leading to products that are low in clarity, partially nonemulsifiable, and in some cases gritty.

U.S. Pat. No. 6,784,251 and U.S. Pat. No. 6,362,280 note that both clarity and color are related somewhat to the particle size of the emulsifiable oxidized wax in an emulsion. However, prior to the present invention, relatively little attention was paid to the effects of feedstock variation upon the emuliflability of oxidized waxes. (Commercially available polyolefin resin feedstock for producing oxidized waxes is typically characterized as having a large particle size distribution.) For example, U.S. Pat. No. 5,401,811 states that, with respect to the described solid state oxidation process, "the particle size of the polyethylene particles are of minor importance." Other publications have disclosed that solid state oxidation preferably involves the use of finely divided polyethylene having a particle size of 300 to 800 microns (see, e.g., U.S. Pat. No. 5,064,908). However, these publications do not address the effect of particle size distribution in a solid state oxidation process.

Therefore, a need exists for an emulsifiable oxidized wax produced from a commercial polyolefin resin via a solid state oxidation process that not only is highly emulsifiable, but also possesses a high degree of clarity. The present invention fulfills this need among others.

SUMMARY OF INVENTION

Commercial feedstock resins for producing oxidizable waxes are often characterized by inconsistent emulsification performance. Applicants have found that a feedstock's average resin particle size and particle size distribution affects the rate and extent of oxidation during solid state thermo-oxidation. In particular, applicants have found that resin particles having a relatively small size undergo more rapid and more uniform oxidation which, surprisingly, results in a polyolefin wax having a higher and more uniform acid number. Moreover, resins having a narrow particle size distribution (e.g., smaller variance) are more evenly oxidized, thus leading to a more uniform acid number in the resulting wax. The relatively higher and more uniform acid number of a wax, in turn, beneficially facilitates uniform dispersion in an aqueous emulsion. In contrast, relatively larger resin particles typically oxidize slower and to a lower acid number; also a high variance in particle size here leads to non homogeneous oxidation of the resin particles. This uneven oxidation and low acid number results in a wax that has poor emulsification performance and/or is not nemulsifable or has a high number of unemulsifiable particles.

An object of the present invention, therefore, is to provide a method for producing a polyolefin wax that is uniformly oxidized. Accordingly, provided is a method for producing an oxidized wax comprising (a) providing a uniform polyolefin resin feedstock having an average particle size from about 80 mesh (177 μm) to about 30 mesh (595 μm), and a standard deviation in particle size of less than about 125 μm; and (b) oxidizing said high molecular weight polyolefin resin particles in a solid state to produce a wax having a predetermined acid number.

Another object of the present invention is to provide a method for producing an aqueous emulsion of an oxidized wax having a high degree of clarity. Therefore, provided is a method for preparing an aqueous emulsification comprising (a) providing a polyolefin resin feedstock having an average particle size from about 80 mesh (177 μm) to about 30 mesh (595 μm) and a standard deviation in particle size of less than about 125 μm; (b) oxidizing said high molecular weight polyolefin resin particles in a solid state to produce a wax having a predetermined acid number; and (c) combining said wax with an aqueous medium to form an emulsion having a Klett value of less than about 175 and a pH of about 4 to about 10.

DETAILED DESCRIPTION OF PREFERRED EMBODIMENTS

The present invention provides a method for producing an oxidized wax that is highly emulsifiable in an aqueous media and has a high emulsion clarity. In particular, the invention is directed to a method for converting a uniform polyolefin resin feedstock, having a small and narrowly distributed particle size, to a wax via solid state oxidation. In certain embodiments, the uniform polyolefin resin feedstock is obtained from a commercially available raw feedstock of polyolefin resin, having a large variance in particle sizes.

In order to simplify the description of this invention, polyethylene is used hereinafter to exemplify polyolefins that can be used with the present invention. However, it is understood that the invention does not only includes homopolymers and copolymers of ethylene, but also includes other types of homopolymeric or copolymeric crystallizable poly-alpha-olefins such as homopolymers and copolymers of propylene, 1-butene, 4-methyl-1-pentene, 3-methyl-1-butene, 4,4-dimethyl-1-pentene, 3-methyl-1-pentene, 4-methyl-1-hexene, 5-ethyl-1-hexene, 6-methyl-1-heptene, 1-hexene, 1-heptene, 1-octene, 1-nonene, 1-decene, and the like.

An aspect of the invention involves providing a uniform polyethylene resin feedstock having an average particle size from about 80 mesh (177 μm) to about 30 mesh (595 μm), more preferably from about 80 mesh (177 μm) to about 40 mesh (420 μm), and even more preferably from about 80 mesh (177 μm) to about 50 mesh (597 μm). Preferably, the particle sizes have a standard deviation of less than about 125 μm, more preferably less than about 100 μm, and even more preferably less than about 75 μm. Mesh size, as used herein, is measured according to the US standard mesh scale. Generally, the average particle size of the uniform polyethylene resin feedstock is predetermined for a particular application.

In preferred embodiments, the uniform polyethylene resin feedstock is derived from a raw feedstock containing a large distribution of resin particle sizes (e.g., a raw feedstock comprising resin particles with a variance in particle size of greater than about 300 mesh). By "raw feedstock" it is meant resins as they are produced directly from a reactor in powder form via, for example, a polyethylene slurry process operating in isobutane or hexane, or as they are derived from, or as an "off-specification" process start-up material. For example, in certain embodiments, the method involves size selection of the feedstock to remove large (e.g., >30 mesh) and small (e.g., <120 mesh) particles prior to oxidation. Controlling feedstock particle size results in less variation in the finished product, particularly with respect to acid number variation within one manufactured lot.

One method for deriving the uniform polyethylene resin feedstock from a raw feedstock involves the use of a separation technique. Any separation technique known in the art can be used provided that it is capable of achieving particle population having a very low particle size and narrow distribution of particle sizes. Examples of such techniques include sieving and classifying by, for example, an air classifier. The separation process may be continuous or batch-wise.

In certain embodiments, a uniform polyethylene resin feedstock is derived from a raw feedstock via a sieving process. These embodiments preferably involve passing the raw feedstock through a series of sieves that are stacked so that each sieve in the series possesses subsequently smaller diameter openings (i.e. the sieves are stacked from the most course to the most fine). A full set of stacked sieves may include, for example, sieves of the following mesh sizes: 6, 8, 12, 16, 20, 30, 35, 40, 50, 70, 80, 100, 120, 140, 200, and 270. The raw feedstock is passed through the sieve stack by application of a force on the raw feedstock in a direction that is generally consistent with the size gradient of the stack. Examples of such forces include gravity, centrifugal force, and shaking.

The sieves may be constructed of any material, such as brass or stainless steel, provided that the material is sufficiently strong to withstand the forces placed upon the raw feedstock and is inert with respect to the raw feedstock.

The distribution of particle size can be determined, for example, by passing a sample of the feedstock through the sieve stack that is arranged having the coarsest sieves first followed by subsequently finer sieves and collecting the portion that accumulates between adjacent sieves. The average particle size of material retained on a particular sieve is calculated as the arithmetic mean of the diameter openings in two adjacent sieves in the stack. Equation 1 shows this calculation.

$$d_i = (d_u + d_o)/2 \quad \text{(Equation 1)}$$

wherein,
$d_i$=diameter of ith sieve in the stack;
$d_u$=diameter opening through which particles will pass (sieve proceeding ith); and
$d_o$=diameter opening through which particles will not pass (ith sieve).

Since it is not practical to count each particle individually and calculate an average, the average particle size can be calculated on a weight basis. This can be done with the Equation 2:

$$d_{gw} = \log^{-1}[\Sigma(W_i \log d_i)/\Sigma W_i] \quad \text{(Equation 2)}$$

The variance in distribution can be expressed, for example, in terms of the standard deviation which is equal to the square root of the arithmetic mean of the squares of the deviations from the arithmetic mean. The standard deviation can be calculated via Equation 3:

$$S_{gw} = \log^{-1}[\Sigma W_i (\log d_i - \log d_{gw})^2/\Sigma W_i]^{0.5} \quad \text{(Equation 3)}$$

Some raw feedstocks contain only a small amount of fine particles (and a corresponding large amount of large particles). Providing a uniform feedstock of fine particles from these raw feedstocks by separation alone may not be economical because a large percentage of the feedstock is removed form the process, and therefore unavailable for oxidation. In addition, recycling the large resin particles may not be practically or economically feasible in certain operations. Therefore, according to certain embodiments, raw feedstock resins are ground to produce a uniform polyolefin resin feedstock prior to oxidation. This can be done in a variety of equipment, such as a jet mill. However, the ground particles obtained in this manner are preferably passed through a classifier to obtain the desired particle size distribution.

Raw polyolefin feedstocks that are oxidizable according to the present invention include homopolymeric or copolymeric crystallizable poly-alpha-olefins. Particularly preferred poly-alpha-olefins include polyethylenes, including low density, linear low density and high density polyethylenes. Preferred polyethylenes also include homopolymers and copolymers of primarily ethylene with butene, hexene, octene, CO, or other monomers known in the art to polymerize with polyethylene. The more preferred polyethylenes include high density polyethylenes due to the difficulty in oxidizing these polyethylenes in the melt phase oxidation processes known in the art. These polyethylenes preferably are homopolyethylenes or copolymers with a percent comonomer content less than 10 weight percent, more preferably less than 2 weight percent.

The polyethylene of the raw feedstock preferably has a density above about 0.910 g/cm$^3$, more preferably from about 0.930 to about 0.980 or higher g/cm$^3$ and even more preferably from about 0.940 to about 0.970 g/cm$^3$. Density is measured by gradient column, for example, according to ASTM D1505-68 or -85. It is understood, however, that the density of the polymer increases as the extent of oxidation increases. This is the result of the substitution of heavier oxygen atoms for lighter hydrogen atoms in the polymer. Consequently, the density ranges of the oxidized wax according to this invention can be, for example, between 0.930 and 1.050 g/cm$^3$, the exact value in any instance depending on the initial density of the starting polymer and the extent of oxidation.

Preferred homopolymeric or copolymeric crystallizable poly-alpha-olefins of the raw feedstock can be prepared by any conventional polymerization processes for preparing polymeric materials. For example, polyethylene having a density of 0.930-0.980 can be obtained using a Philips catalyst system, i.e., chromium oxide on a SiO$_2$—Al$_2$O$_3$ support wherein at least part of the chromium is in the hexavalent state. The polymerization is performed at temperatures of 60-260° C. (See, e.g., U.S. Pat. No. 2,825,721.) Another catalyst system capable of forming high density polyethylene used herein is disclosed in U.S. Pat. No. 2,816,883. Yet another catalysts system consisting essentially of vanadium oxytrichloride and ethyl aluminum dichloride will yield high density polyethylene. Still another catalyst system yielding very high molecular weight polyethylene and a density of about 0.96 comprises TiCl$_3$ and diethyl aluminum chloride. A still further method for producing high density polyethylene is the Ziegler process which involves the use of a catalyst consisting essentially of compound of Group IV-B, V-B, and IV-B metals and an aluminum trialkyl compound as described in Belgian Patent No. 533,362. Yet another method for forming high density polyethylene operable herein is disclosed in U.S. Pat. No. 2,949,447. Polyethylene feedstocks produced by the newer metallocene catalysts are equally suitable. Other methods of producing polyethylene with a density in the range of 0.930-0.980 are well known to those skilled in the art. Conventional branched low density polyethylene (e.g., 0.91-0.93 g/cc) can be prepare in accordance with GB 471, 590 or U.S. Pat. No. 2,153,553, as well as other known methods.

Particularly preferred raw feedstocks are high density, high molecular weight type resins. Such raw feedstocks preferably are not densified and preferably are not compounded with any stabilizers, such as antioxidants. Particularly preferred raw feedstocks are those exhibiting a "popcorn" type surface (as opposed to a generally spherical or flat surface) with a relatively large pore size and surface area. However, it is also contemplated that raw feedstocks of the present invention include conventional high density polyolefins, such as polyethylene, that have been densified, palletized, recovered via recycling, or obtained from an "off-specification" source.

Preferably high density polyethylene, feedstocks are fractional melt index resins having a melt index (MI) of less than about 20 g/10 min. at 190 C with a 21.6 kg weight, more preferably less than about 1.0 g/10 min. at 190 C with a 21.6 kg weight, and even more preferably from about 0.1 to about 1.0 g/10 min. at 190 C with a 21.6 kg weight. Melt index is determined using ASTM method D1238-89 or -79. Feedstocks with higher MI's can be practiced with the present invention provided that they possess the desirable properties after oxidation.

According to another aspect of the invention, the uniform polyolefin resin feedstock is oxidized in a solid state to produce a wax having a predetermined acid number. In general, the oxidation procedure involves passing an oxygen-containing gas (e.g., air or oxygen or some ozone) over a polymer in particulate form at a temperature of at least about 65° C. but below the crystalline melt point of a significant portion of the particulate polyethylene. For certain polyethylenes, this melting temperature is typically below about 135° C. The temperature of the process according to the present invention is preferably about 95° to about 135° C. with a temperature of about 130° to about 132° C. being most preferred. The upper limit of the process temperature of the present invention is dictated by the melting or softenening point of the polyethylene since molten polyethylene is difficult to oxidize according to the present invention. At process temperatures much below the lower limit, the oxidation is significantly slower than would be practical in a commercial process.

The oxygen-containing gas used in the process according to the present invention can be any gas or mixture of gases containing molecular oxygen or ozone that would oxidize the polyethylene. However, air is preferred due to availability, ease of handling, and safety factors. The flow of oxygen-containing gas required to oxidize the polyethylene according to the present invention depends upon the reactor design and processing parameters such as type of diffuser plate, diameter of reactor, and cross sectional area of a fluidized bed. The process according to the present invention preferably entails continuously removing air from one end of the reactor to the other and recycling it, along with makeup oxygen, to supply adequate oxygen for oxidation of the polyethylene resin. The oxygen/air flow through the reactor is preferable from about 0.4 to about 1.0 standard liters per minute per kilogram (SLM/ kg). Preferably the reactor is operated at a pressure from about 25 to about 125 psig.

The oxidation process according to the present invention can be preformed in a variety of reactors or types of equipment. For example, one method involves passing oxygen-containing gas into an oven and over the feedstock resin. Another method involves suspending particles of the feedstock resin in water or an inert organic solvent and either bubbling air through the suspension or pressurize the system with air. Yet another method involves passing an oxygen-containing gas through a fluidized bed of polyethylene particles. Still other methods involve passing an oxygen containing gas through a twin cone or V-blending apparatus containing the resin feedstock. The oxidation process can be batch-wise or continuous, but is preferably continuous.

The process according to the present invention can oxidize the particulate polyethylene to significantly high and consistent acid numbers at relatively reduced residence times. The progress of the oxidation can be determined by several means, such acid number by titration or instrumental methods such as Fourier transform infrared (FTIR) spectroscopy or Near Infrared (NIR) spectroscopy. In general, products can be oxidized readily to any desired acid value, however, preferred particulate oxidized polyethylene product removed from the reactor has an acid number of at least 4, preferably from about 10 to about 50, and more preferably from about 10 to about 35. The acid numbers can be determined, for example, by titration in boiling xylene with methanolic or butanolic KOH against phenolphthalein, 1 g of oxidized polyethylene having been dissolved in from 100 to 200 g of xylene and the KOH solution being $\frac{1}{10}$ normal. Waxes having a relatively lower acid number are more sensitive to variations in the feedstock because the overall degradation and chemical functionality are less. Additionally, the lower acid number means that any variation in emulsification performance will be magnified. Since the variation in feedstock particle size is controlled, production of waxes possessing lower acid numbers is most benefited by the present invention.

As previously indicated, high molecular weight polyethylene of the feedstock undergoes degradation via oxidation to form polyethylene waxes of relatively lower molecular weight. The degree of oxidation of the feedstock determines, in part, the amount of degradation and, thus, the molecular weight of the resulting oxidized wax. The viscosity and Mw of the oxidized waxes can vary depending upon the desired properties as required by the application. As used herein, Mw is based on gel permeation chromatography (GPC) unless otherwise indicated. In certain embodiments, an emulsifiable wax has a Mw of no greater than about 20,000 and a viscosity of no greater than about 15,000 cps at 150 C. More preferably, the wax has an Mw of no greater than about 10,000 and a viscosity of no greater than about 10,000 cps at 150 C, and even more preferably, the wax has a Mw of about 2000 to about 8000 and a viscosity of about 200 to about 800 cps at 190° C.

The waxes of the present invention preferably have a melt point/peak ($T_m$) such that it is a solid at room temperature but melts at a temperature which is convenient for processing. In a preferred embodiment, the wax has a $T_m$ of about 50 to about 200° C., more preferably, from about 100 to about 150° C., and even more preferably from about 125 to about 145° C.

In a preferred embodiment, the oxidized wax is combined with an aqueous medium to form an emulsion. The amount of water in the emulsion generally varies depending upon the desired concentration of the emulsion, but is generally between about 40 and about 80 wt %, preferably between about 50 and about 70 wt %, and more preferably between about 60 to about 65 wt % water being most preferred.

In certain embodiments, a base is added to the emulsion to render the aqueous solution basic and is typically selected from organic or inorganic amines and potassium hydroxide. Amounts of base may range up to about 10 wt %, preferably from about 1 to about 8 wt %, more preferably, from about 2 to about 6 wt %, with about 3 to about 4 wt % base being most preferred. One or more surfactants may also be added to the emulsion.

A relative measure of particle size is the Klett number. Preferably the emulsion has a Klett value of no greater than about 175, more preferably no greater than about 75, even more preferably no greater than about 50, and most preferably no greater than about 30; and a pH of about 4 to about 10.

The emulsion (diluted to a 1% solids content) preferably has a light transmittance at 525 nm with a 20 mm light path length of at least 50% preferably at least about 65%, more preferably at least about 75% still more preferably at least about 85%, and even more preferably at least about 90% In the most preferred embodiment, the wax has an emulsion % transmittance of better than 95%

One measure of an oxidized wax ability to be emulsified is its saponification number—the higher the number, the more readily the compound is emulsified. In a preferred embodiment, the emulsifiable wax has a saponification number from about 1 to about 500 mg KOH/g, more preferably, from about 20 to about 150 mg KOH/g, and even more preferably from about 40 to about 95 mg KOH/g.

EXAMPLES

Example 1

Approximately 200 g of wax having an acid number of 31.6 mg KOH g$^{-1}$ was obtained by oxidizing a polyethylene feedstock having a uniform particle size of 30-120 mesh (681 μm to 147 μm) The oxidized wax was placed into a pressure autoclave equipped with an agitator, thermocouple, and a means to heat and control the temperature. To this was added 175 g of deionised water, 55 g of ethoxylated nonyl phenol surfactant, and 105 ml of a 5% w/v KOH solution. The autoclave was then heated to 150° C. for 30 minutes. In a separate pressure vessel, 34 ml of 5% w/v KOH solution and 206 g of deionised water were heated to 95° C. and injected into the autoclave. The resulting mixture was reheated to 150° C. and then cooled to room temperature. The resulting emulsion had a pH of 9.05 and a Klett of 159.

Comparative Example 1

The above procedure was repeated to prepare an emulsion from a sample of wax which was produced directly from a raw feedstock. This emulsion had a pH of 9.07 and a Klett of 189.5.

Example 2

Approximately 140 g of wax having an acid number of 31.6 mg KOH g$^{-1}$ was obtained by oxidizing a polyethylene feedstock having a uniform particle size of 30-120 mesh (681 μm to 147 μm). The oxidized wax was placed into a pressure autoclave equipped with an agitator, thermocouple, and a means to heat and control the temperature. To this was added 624 g of water, 52.5 g of ethoxylated tallow amine surfactant, 1.65 g of sodium metabisulfite, and 14 g of glacial acetic acid. The autoclave was heated to 150° C. for 30 minutes and then cooled to room temperature. The resulting emulsion had a pH of 4.38 and a Klett of 155.

Comparative Example 2

The above procedure was repeated to prepare an emulsion from a sample of wax which was produced directly from a raw feedstock. This emulsion had a pH of 4.38 and a Klett of 302.

Examples 1 and 2 demonstrate the advantage in terms of emulsion clarity (the lower the Klett value the greater the clarity of the emulsion) to be gained from using feedstock which has been size selected prior to oxidation for both non-ionic and cationic formulations. The clarity of an emulsion is both important and useful to users of wax emulsions. The greater clarity of the emulsion achieved by the use of a controlled particle size feedstock contributes to ease of processing, for example filtering the emulsion which proceeds more rapidly if the clarity is high. The emulsion will dry to give a transparent, grit free film with high gloss which is important to many applications.

Having thus described a few particular embodiments of the invention, various alterations, modifications, and improvements will readily occur to those skilled in the art. Such alterations, modifications, and improvements, as are made obvious by this disclosure, are intended to be part of this description though not expressly stated herein, and are intended to be within the spirit and scope of the invention.

Accordingly, the foregoing description is by way of example only, and not limiting. The invention is limited only as defined in the following claims and equivalents thereto.

What is claimed is:

1. A method for producing an oxidized wax comprising:
   a. providing a high molecular weight uniform polyolefin resin feedstock having an average particle size from about 80 mesh to about 30 mesh, and a standard deviation in particle size of not greater than about 125 µm; and
   b. oxidizing said high molecular weight polyolefin resin particles in their solid state to produce a wax having a predetermined acid number.

2. The method of claim 1 wherein said standard deviation in particle size of not greater than about 100 µm.

3. The method of claim 1 wherein said standard deviation in particle size of not greater than about 75 µm.

4. The method of claim 1 wherein said polyolefin resin has a melt flow index of less than about 2.0.

5. The method of claim 1 wherein said polyolefin resin has a melt flow index of between about 0.7 to about 1.0.

6. The method of claim 1 wherein said polyolefin resin has a melt flow index of between about 0.1 to about 1.0.

7. The method of claim 1 wherein said polyolefin resin is polyethylene.

8. The method of claim 1 wherein said polyolefin resin is high density polyethylene.

9. The method of claim 1 wherein said polyolefin resin is comestible-grade polyethylene.

10. The method of claim 1 wherein said resin feedstock is essentially free of stabilizers.

11. The method of claim 10 wherein said stabilizers are antioxidants.

12. The method of claim 1 wherein said acid number is from about 10 to about 50.

13. The method of claim 12 wherein said acid number is from about 10 to about 25.

14. The method of claim 1 wherein said providing involves deriving said uniform polyolefin resin feedstock from a raw resin feedstock.

15. The method of claim 14 wherein said providing involves separating said uniform polyolefin resin feedstock from a raw feedstock comprising resin particles with a standard deviation in particle size of greater than about 300 µm.

16. The method of claim 14 wherein said deriving involves grinding said raw feedstock to produce said uniform polyolefin resin feedstock.

17. The method of claim 16 wherein said raw feedstock is densified.

18. The method of claim 14 wherein said deriving involves separating said uniform polyolefin resin feedstock from a raw feedstock comprising resin particles with a standard deviation in particle size of greater than about 3000 µm.

19. The method of claim 18 wherein said separating involves sieving said raw feedstock to produce said uniform polyolefin resin feedstock.

20. The method of claim 19 wherein said raw feedstock is undensified.

21. A method for preparing an aqueous emulsification comprising:
   a. providing a high molecular weight polyolefin resin feedstock having an average particle size from about 80 mesh to about 30 mesh and a standard deviation in particle size of less than about 125 µm;
   b. oxidizing said high molecular weight polyolefin resin particles in their solid state to produce a wax having a predetermined acid number; and
   c. combining said wax with an aqueous medium to form an emulsion having a Klett value of less than about 175 and a pH of about 4 to about 10.

22. The method of claim 21 wherein said emulsion is cationic.

23. The method of claim 21 wherein said emulsion in non-ionic.

* * * * *